(12) United States Patent
Shigeta

(10) Patent No.: US 12,176,761 B2
(45) Date of Patent: Dec. 24, 2024

(54) ROTOR AND MOTOR

(71) Applicant: NIDEC CORPORATION, Kyoto (JP)

(72) Inventor: Tatsuki Shigeta, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 600 days.

(21) Appl. No.: 17/311,688

(22) PCT Filed: Nov. 25, 2019

(86) PCT No.: PCT/JP2019/045894
§ 371 (c)(1),
(2) Date: Jun. 8, 2021

(87) PCT Pub. No.: WO2020/137293
PCT Pub. Date: Jul. 2, 2020

(65) Prior Publication Data
US 2022/0029482 A1 Jan. 27, 2022

(30) Foreign Application Priority Data
Dec. 25, 2018 (JP) .................................. 2018-241476

(51) Int. Cl.
*H02K 1/278* (2022.01)
*H02K 11/215* (2016.01)
*H02K 21/16* (2006.01)

(52) U.S. Cl.
CPC ........... *H02K 1/278* (2013.01); *H02K 11/215* (2016.01); *H02K 21/16* (2013.01)

(58) Field of Classification Search
CPC .......... H02K 1/278; H02K 1/276; H02K 1/27; H02K 1/2766; H02K 1/22; H02K 1/2773; H02K 1/2706; H02K 1/274; H02K 1/28; H02K 1/2746; H02K 1/2791; H02K 1/30; H02K 1/2733; H02K 15/03
See application file for complete search history.

(56) References Cited

U.S. PATENT DOCUMENTS

| 3,727,302 A  * | 4/1973 | Phelon ................ H02K 1/2791 29/598 |
| 6,492,755 B1 * | 12/2002 | Jones ....................... H02K 1/28 310/156.16 |
| 9,680,342 B2 | 6/2017 | Arimatsu |
| 10,084,361 B2 | 9/2018 | Kitaji et al. |

(Continued)

FOREIGN PATENT DOCUMENTS

| JP | 19308150 A | 11/1997 |
| JP | 2004023944 A | 1/2004 |

(Continued)

OTHER PUBLICATIONS

International Search Report in PCT/JP2019/045894, mailed Feb. 4, 2020. 4pp.

*Primary Examiner* — Bryan R Perez
(74) *Attorney, Agent, or Firm* — HAUPTMAN HAM, LLP

(57) ABSTRACT

An aspect of the present invention provides a rotor rotatable about a central axis, the rotor including: a rotor core having a ring shape; a rotor magnet fixed to a radially outer face of the rotor core; and a protective member circumferentially wound around the rotor magnet to press the rotor magnet from radially outward of the rotor magnet. The rotor magnet includes a hanging portion on which a first end of the protective member is hung circumferentially.

14 Claims, 6 Drawing Sheets

(56) References Cited

U.S. PATENT DOCUMENTS

| | | | |
|---|---|---|---|
| 2015/0180294 A1* | 6/2015 | Vollrath | H02K 15/03 |
| | | | 310/156.31 |
| 2019/0028009 A1* | 1/2019 | Shimokawa | F04D 29/043 |
| 2019/0241259 A1* | 8/2019 | Tsutsumi | H02K 1/02 |

FOREIGN PATENT DOCUMENTS

| | | |
|---|---|---|
| JP | 2010252554 A | 11/2010 |
| JP | 4932620 B2 | 5/2012 |
| JP | 5918484 B2 | 5/2016 |
| WO | 2018105046 A1 | 6/2018 |

* cited by examiner

ROTOR AND MOTOR

CROSS-REFERENCE TO RELATED APPLICATIONS

This is the U.S. national stage of application No. PCT/JP2019/045894, filed on Nov. 25, 2019, and priority under 35 U.S.C. § 119(a) and 35 U.S.C. § 365(b) is claimed from Japanese Patent Application No. 2018-241476, filed on Dec. 25, 2018.

FIELD OF THE INVENTION

The present invention relates to a rotor and a motor.

BACKGROUND

A known holding member holds a magnet from radially outward of the magnet. There is a holding member having a cylindrical shape formed by spirally winding a fiber bundle.

In winding a fiber bundle from radially outward of a magnet while applying a tension to the fiber bundle, fixation of ends of the fiber bundle with an adhesive or the like is occasionally unsatisfactory in terms of strength. This may result in a situation in which the fiber bundle unfavorably presses the magnet owing to an unsatisfactory tension applied to the fiber bundle.

SUMMARY

An aspect of the present invention provides a rotor rotatable about a central axis, the rotor including: a rotor core having a ring shape; a rotor magnet fixed to a radially outer face of the rotor core; and a protective member circumferentially wound around the rotor magnet to press the rotor magnet from radially outward of the rotor magnet. The rotor magnet includes a hanging portion on which a first end of the protective member is hung circumferentially.

An aspect of the present invention provides a motor including the rotor described above and a stator located radially outside the rotor.

The above and other elements, features, steps, characteristics and advantages of the present disclosure will become more apparent from the following detailed description of the preferred embodiments with reference to the attached drawings.

DETAILED DESCRIPTION

In the respective drawings, a Z axis illustrated as appropriate extends in a vertical direction, of which a positive side is defined as an "upper side" and a negative side is defined as a "lower side". Also in the respective drawings, a central axis J illustrated as appropriate indicates an imaginary line that is parallel with the Z axis and extends in the vertical direction. In the following description, the term "axial direction", "axial", or "axially" refers to an axial direction of the central axis J, that is, a direction parallel with the vertical direction. The term "radial direction", "radial", or "radially" refers to a radial direction from the central axis J. The term "circumferential direction", "circumferential", or "circumferentially" refers to a circumferential direction about the central axis J.

In the following embodiment, the lower side corresponds to a first side in the axial direction. It should be noted that the definitions, "vertical direction", "upper side", and "lower side" are merely used for explaining arrangement relationships and the like of constituent elements. Actual arrangement relationships and the like may be arrangement relationships and the like other than the arrangement relationships and the like indicated by the definitions.

Figure 1:
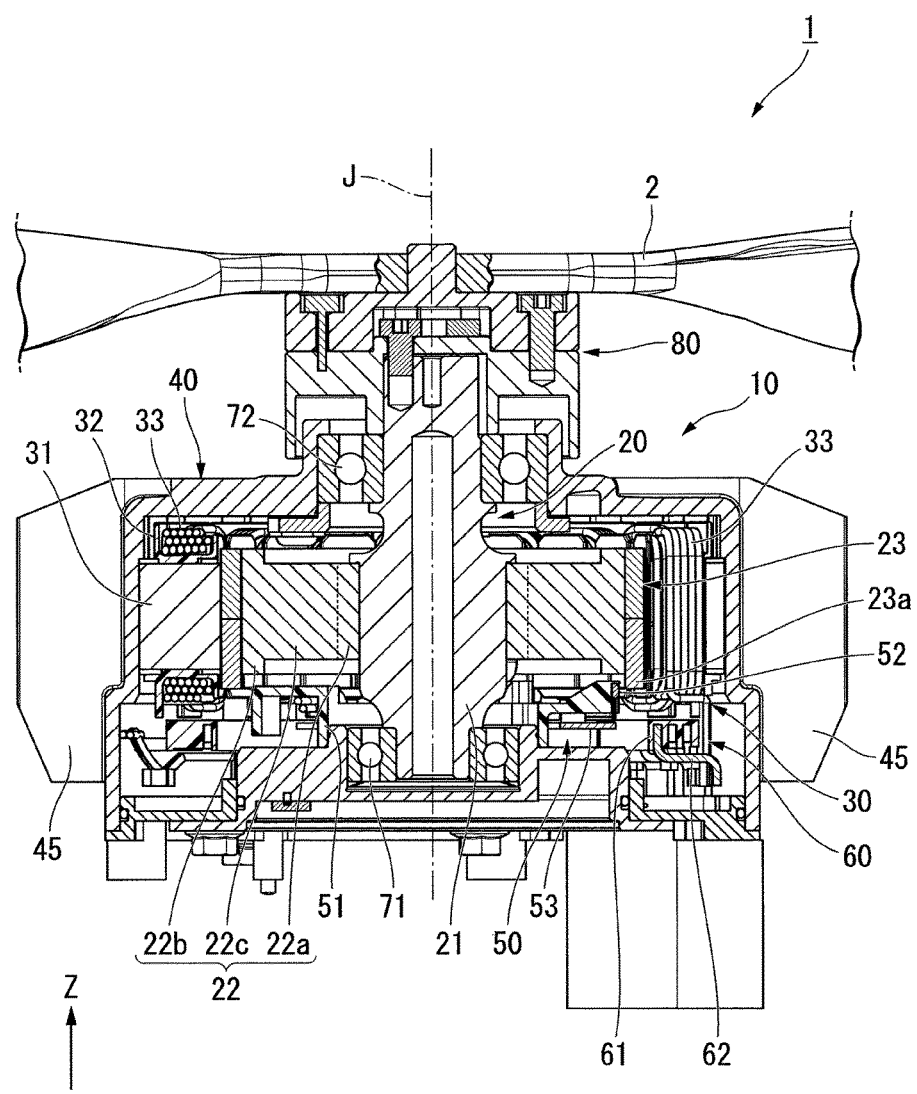
FIG. 1 is a sectional view of a rotor apparatus according to the present embodiment.

As illustrated in FIG. 1, a motor 10 according to the present embodiment is installed in a rotor apparatus 1. The rotor apparatus 1 is mounted on, for example, an unmanned flying object. The rotor apparatus 1 includes the motor 10 and a propeller 2.

The motor 10 includes a rotor 20 that is rotatable about the central axis J, a stator 30, a housing 40, a sensor assembly 50, a bus bar assembly 60, a first bearing 71, a second bearing 72, and a propeller mount portion 80.

The housing 40 accommodates therein the rotor 20, the stator 30, the sensor assembly 50, the bus bar assembly 60, the first bearing 71, and the second bearing 72. The housing 40 has on its outer peripheral face a plurality of fins 45 arranged circumferentially.

The stator 30 is located radially outside the rotor 20. The stator 30 includes a stator core 31, an insulator 32, and a plurality of coils 33. The coils 33 are mounted to the stator core 31 with the insulator 32 interposed between the coils 33 and the stator core 31.

The sensor assembly 50 is located below the rotor 20. The sensor assembly 50 includes a sensor holder 51, a rotation sensor 52, and a circuit board 53. In other words, the motor 10 includes the sensor holder 51, the rotation sensor 52, and the circuit board 53.

The rotation sensor 52 is held by the sensor holder 51. The rotation sensor 52 is a magnetic sensor that detects a magnetic field of a rotor magnet 23 to be described later. The rotation sensor 52 is, for example, a Hall element such as a Hall IC. The rotation sensor 52 detects the magnetic field of the rotor magnet 23 to detect rotation of the rotor 20. Although not illustrated in the drawings, the sensor assembly 50 includes a plurality of the rotation sensors 52 arranged circumferentially. Each rotation sensor 52 may be a magnetoresistance element. The circuit board 53 is fixed to the sensor holder 51. The rotation sensors 52 have terminals electrically connected to the circuit board 53.

The bus bar assembly 60 is located below the stator 30. The bus bar assembly 60 is located radially outside the sensor assembly 50. The bus bar assembly 60 includes a bus bar holder 61 and a bus bar 62. The bus bar holder 61 holds the bus bar 62. The bus bar 62 is electrically connected to the coils 33.

The first bearing 71 and the second bearing 72 support the rotor 20 in a rotatable manner. Each of the first bearing 71 and the second bearing 72 is, for example, a ball bearing. The propeller mount portion 80 corresponds to a portion where the propeller 2 is mounted. The propeller mount portion 80 is fixed to an upper end of the rotor 20. The propeller mount portion 80 is located outside the housing 40.

Figure 2:
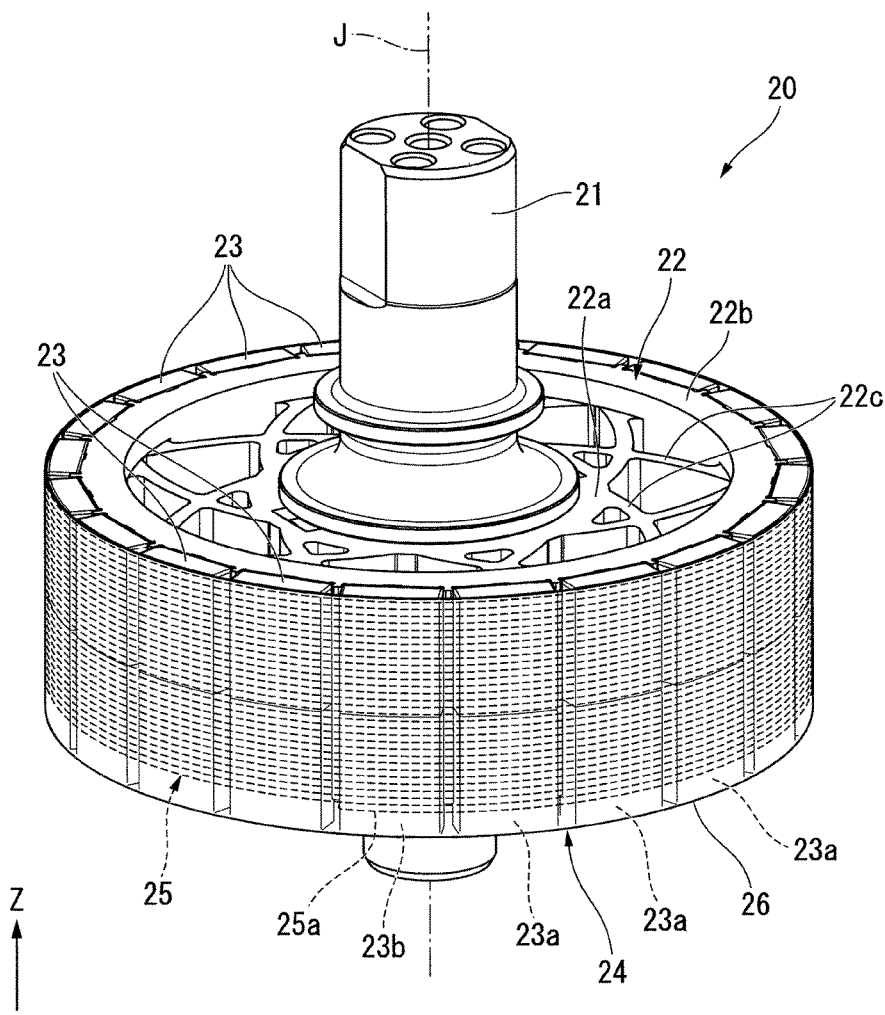
FIG. 2 is a perspective view of a rotor according to the present embodiment.
Figure 3:
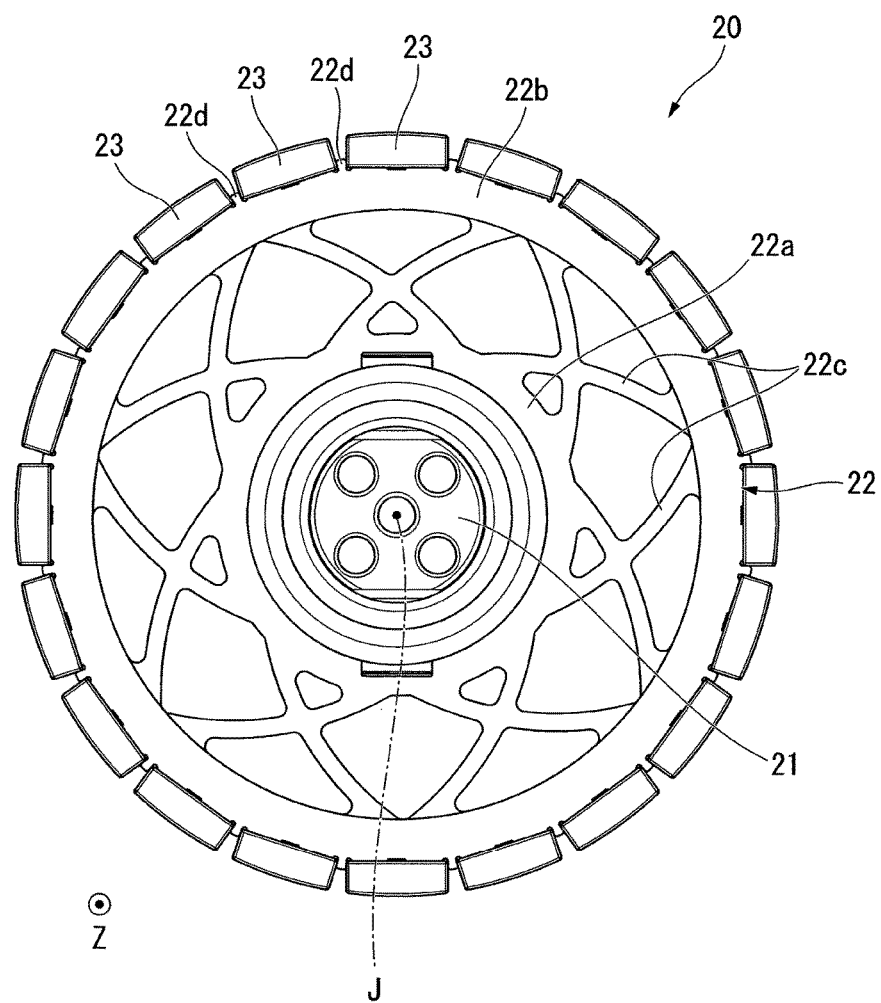
FIG. 3 is a view of the rotor according to the present embodiment, the rotor being seen from above.

As illustrated in FIGS. 2 and 3, the rotor 20 includes a shaft 21, a rotor core 22, the rotor magnet 23, and a rotor cover 24. It should be noted that FIG. 3 does not illustrate the rotor cover 24. The shaft 21 is disposed along the central axis J. The shaft 21 has a columnar shape about the central axis J and extends axially. As illustrated in FIG. 1, the shaft 21 has an upper end protruding upward of the housing 40. The propeller mount portion 80 is fixed to the upper end of the shaft 21.

The rotor core 22 is fixed to an outer peripheral face of the shaft 21. As illustrated in FIGS. 2 and 3, the rotor core 22 has a ring shape. In the present embodiment, the rotor core 22 has an annular ring shape about the central axis J. The rotor core 22 includes an inner core portion 22a, an outer core portion 22b, a plurality of connection portions 22c, and a plurality of support portions 22d.

The inner core portion 22a has a ring shape and extends circumferentially. In the present embodiment, the inner core portion 22a has an annular ring shape about the central axis J. The inner core portion 22a is fixed to the outer peripheral face of the shaft 21. The outer core portion 22b is located radially outside the inner core portion 22a. In the present embodiment, the outer core portion 22b has a ring shape and extends circumferentially. More specifically, the outer core portion 22b has an annular ring shape about the central axis J. As illustrated in FIGS. 1 and 2, the outer core portion 22b protrudes axially upward and downward of the inner core portion 22a.

The connection portions 22c are located between the inner core portion 22a and the outer core portion 22b in the radial direction. The connection portions 22c connect the inner core portion 22a to the outer core portion 22b. The connection portions 22c are arranged circumferentially. The connection portions 22c are equal in axial size to the inner core portion 22a. The connection portions 22c have upper ends disposed at the same position as an upper end of the inner core portion 22a in the axial direction. The connection portions 22c have lower ends disposed at the same position as a lower end of the inner core portion 22a in the axial direction. As illustrated in FIG. 3, the support portions 22d protrude radially outward from the outer core portion 22b. The support portions 22d are equidistantly arranged in the circumferential direction.

The rotor magnet 23 is fixed to a radially outer face of the rotor core 22. In the present embodiment, the rotor magnet 23 is fixed to the radially outer face of the rotor core 22 with an adhesive. The radially outer face of the rotor core 22 corresponds to a radially outer face of the outer core portion 22b. In the present embodiment, the rotor 20 includes a plurality of the rotor magnets 23 circumferentially spaced apart from one another. The rotor magnets 23 are equidistantly arranged in the circumferential direction. The number of rotor magnets 23 is, for example, 20.

Each of the rotor magnets 23 is disposed between circumferentially adjacent two of the support portions 22d. Each of the rotor magnets 23 is supported by adjacent two of the support portions 22d from circumferentially opposite sides thereof. As illustrated in FIGS. 2 and 3, the rotor magnets 23 each have a substantially parallelepiped shape and extends axially. The rotor magnets 23 each have chamfered corners. As illustrated in FIGS. 1 and 2, in the present embodiment, each of the rotor magnets 23 includes two magnets that are axially connected to each other.

The rotor magnets 23 each have the north pole and the south pole directed radially. With regard to circumferentially adjacent two of the rotor magnets 23, the radial positions of the north pole and south pole are inverted. In other words, with regard to circumferentially adjacent two of the rotor magnets 23, the north pole of one rotor magnet 23 is directed radially outward, whereas the south pole of the other rotor magnet 23 is directed radially outward.

The rotor magnets 23 have upper ends disposed at the same position as an upper end of the outer core portion 22b in the axial direction. The rotor magnets 23 have lower ends located below a lower end of the outer core portion 22b. The rotor magnets 23 have portions located below the outer core portion 22b, and the portions correspond to protrusions 23a protruding downward of the rotor core 22. In other words, the rotor magnets 23 include the protrusions 23a protruding downward of the rotor core 22.

As illustrated in FIG. 1, the rotation sensors 52 are located radially inside the protrusions 23a. This configuration therefore causes the rotation sensors 52 to favorably detect magnetic fields of the rotor magnets 23 each having the north pole and the south pole directed radially. This configuration thus causes the rotation sensors 52 to accurately detect rotation of the rotor 20. In addition, this configuration eliminates a necessity to separately provide a magnet for detection at the rotation sensor 52 in addition to the rotor magnets 23. This configuration therefore enables reduction in parts count of the motor 10. The rotation sensors 52 are disposed opposite lower ends of radially inner faces of the protrusions 23a with a radial clearance defined between the rotation sensors 52 and the protrusions 23a.

As illustrated in FIG. 2, the rotor cover 24 is located radially outside the rotor magnets 23. In the present embodiment, the rotor cover 24 has a cylindrical shape about the central axis J. The rotor cover 24 are opened at its axially opposite ends. The rotor cover 24 surrounds and covers the rotor core 22 and the rotor magnets 23 from radially outward of the rotor core 22 and the rotor magnets 23. The rotor cover 24 includes a protective member 25 and a resin portion 26. In other words, the rotor 20 includes the protective member 25 and the resin portion 26.

The protective member 25 is circumferentially wound around the rotor magnets 23 to press the rotor magnets 23 from radially outward of the rotor magnets 23. The protective member 25 is in contact with radially outer faces of the rotor magnets 23. In the present embodiment, the protective member 25 is provided on almost the entire portions, which radially overlap the rotor core 22, of the rotor magnets 23.

In the present embodiment, the protective member 25 has a thread shape with elasticity. The protective member 25 is spirally wound around the radially outer faces of the rotor magnets 23. In a strict sense, the protective member 25 wound across circumferentially adjacent two of the rotor magnets 23 is not in contact with the radially outer faces of the rotor magnets 23 at a position between the circumferentially adjacent two rotor magnets 23, and has a linear shape by a tension. The protective member 25 is therefore wound in a substantially spiral shape.

In the present embodiment, the protective member 25 circumferentially expands by a tension. In the present embodiment, the protective member 25 is a non-magnetic member. This configuration therefore inhibits generation of eddy current at the protective member 25 by a magnetic flux as compared with a case where the protective member 25 is a magnetic member. This configuration thus enables reduction in loss caused by the eddy current, and inhibits increase in temperature of the rotor 20 by the eddy current. The protective member 25 is made of, for example, a resin. Examples of the resin may include a polyamide resin and the like.

Figure 4:
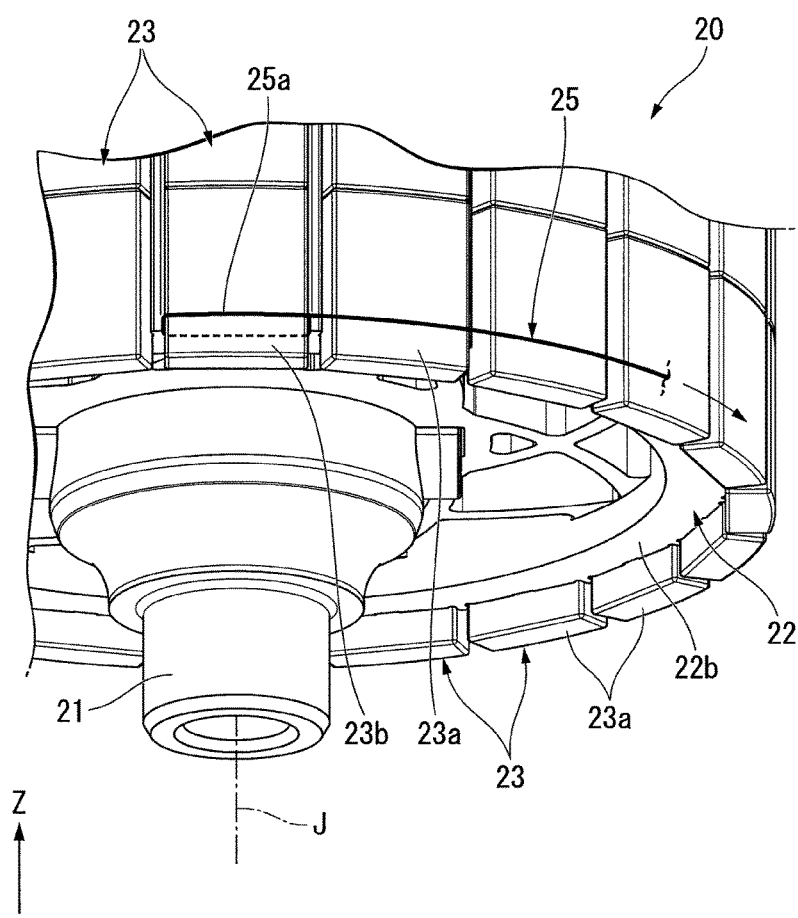
FIG. 4 is a perspective view of a part of procedures for manufacturing the rotor according to the present embodiment.

As illustrated in FIGS. 2 and 4, the protective member 25 has a first end 25a having a loop shape. In the present embodiment, the first end 25a is formed into a loop shape by folding back an end of the protective member 25 having the thread shape and tying the end and a portion of the protective member 25 together. One of the protrusions 23a of the rotor magnets 23 passes through the first end 25a having the loop shape. The first end 25a is thus circumferentially hung on one of the protrusions 23a of the rotor magnets 23. In other words, one of the protrusions 23a of the rotor magnets 23 serves as a hanging portion 23b on which the first end 25a of the protective member 25 is circumferentially hung. In the present embodiment, the first end 25a is a winding starting end of the protective member 25. The first end 25a has a radially inner portion that is in contact with, for example, a lower face of the outer core portion 22b. The first end 25a has a portion that is located in a clearance between the hanging portion 23b and the protrusion 23a circumferentially adjoining the hanging portion 23b.

The resin portion 26 is made of a resin, and covers the protective member 25 from radially outward of the protective member 25. The resin portion 26 has a cylindrical shape about the central axis J. The resin portion 26 is made of an adhesive for fixing the protective member 25 to the radially outer faces of the rotor magnets 23. In other words, in the present embodiment, the protective member 25 is fixed to the rotor magnets 23 with the adhesive. Examples of the adhesive may include an epoxy-based adhesive, and the like. Although not illustrated in the drawings, the protective member 25 has a second end fixed to the radially outer faces of the rotor magnets 23 with the resin portion 26.

In the present embodiment, the resin portion 26 is formed by curing an adhesive applied from radially outward of the protective member 25. In a strict sense, as described above, the protective member 25 is wound in the substantially spiral shape. Therefore, the resin portion 26 formed by applying the adhesive from radially outward of the protective member 25 also has a substantially cylindrical shape in accordance with the shape of the protective member 25 in some cases. In such a case, the rotor cover 24 has a substantially cylindrical shape.

As illustrated in FIG. 4, a worker and the like who and which manufacture the rotor 20 fix the rotor magnets 23 to the radially outer face of the rotor core 22. The worker and the like form the first end 25a of the protective member 25 into the loop shape, and hang the first end 25a on the hanging portion 23b which is one of the protrusions 23a. In the state before the rotor cover 24 is formed, a clearance between circumferentially adjacent two of the protrusions 23a is opened at its lower side and radially opposite sides. The first end 25a having the loop shape is therefore hung on the hanging portion 23b from below. After hanging the first end 25a, the worker and the like spirally wind the protective member 25 around the rotor magnets 23 upward from below while circumferentially pulling the protective member 25 so as to apply a tension to the protective member 25.

Figure 5:
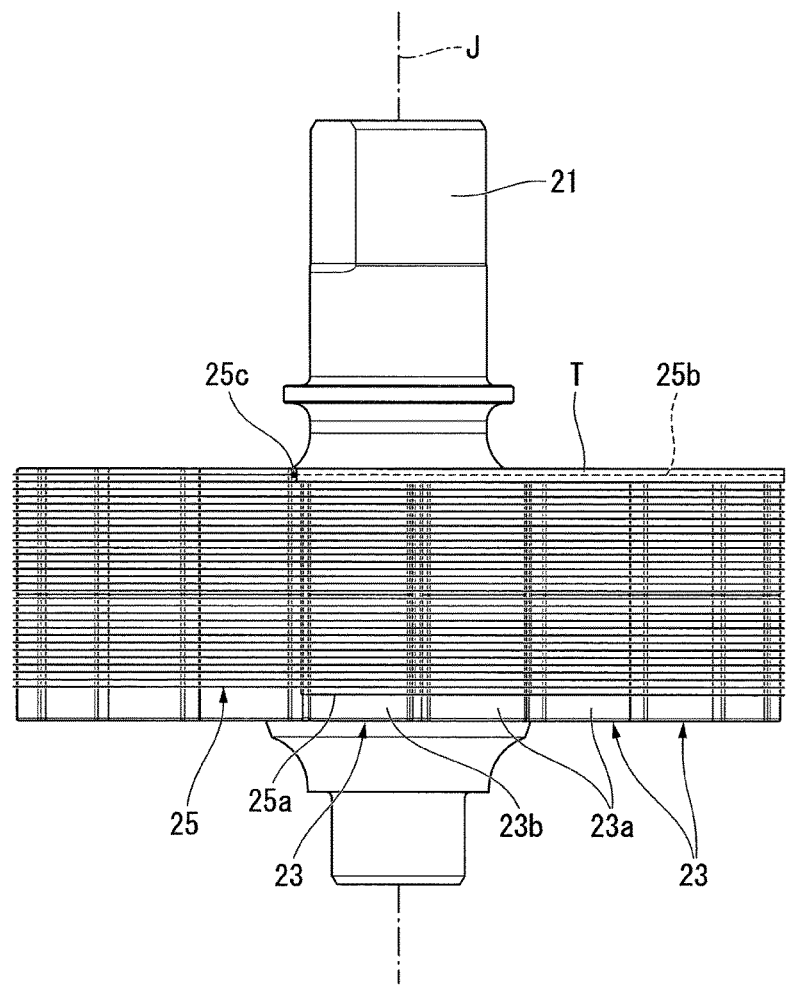
FIG. 5 is a view of the part of the procedures for manufacturing the rotor according to the present embodiment, the part being seen from radially outside.

As illustrated in FIG. 5, after winding the protective member 25 around the rotor magnets 23 up to the upper ends of the rotor magnets 23, the worker and the like affix a winding ending portion 25b of the protective member 25 to the radially outer faces of the rotor magnets 23 with a tape T while continuously applying the tension to the protective member 25. The winding ending portion 25b corresponds to a portion including the second end of the protective member 25 in the process of winding the protective member 25. The winding ending portion 25b has a circumferential size that is increased to an extent capable of fixing the protective member 25 to the rotor magnets 23 while continuously applying the tension to the protective member 25.

Next, the worker and the like apply the adhesive to the protective member 25 from radially outward of the protective member 25, and fix the protective member 25 to the radially outer faces of the rotor magnets 23 with the adhesive. The adhesive is cured to form the resin portion 26. After forming the resin portion 26 by curing the adhesive, the worker and the like peel the tape T, and cut and remove the winding ending portion 25b of the protective member 25 affixed with the tape T. This is because the winding ending portion 25b affixed with the tape T is not fixed with the adhesive. The rotor cover 24 is formed as described above, and the rotor 20 is thus manufactured.

Since the winding ending portion 25b is removed as described above, the second end 25c of the protective member 25 corresponds to a winding ending end at a portion, which is not affixed with the tape T, of the protective member 25 in the rotor 20 thus manufactured.

The term "worker and the like" as used herein refers to a worker, an assembly apparatus, and the like who and which perform various kinds of work in manufacturing processes. Each kind of work may be performed only by the worker, may be performed only by the assembly apparatus, or may be performed by the worker and the assembly apparatus.

According to the present embodiment, one of the rotor magnets 23 includes the hanging portion 23b on which the first end 25a of the protective member 25 is hung circumferentially. Therefore, when the first end 25a which is the winding starting end of the protective member 25 is hung on the hanging portion 23b as described above, the protective member 25 is firmly fixed in the circumferential direction in winding the protective member 25 in the circumferential direction. The protective member 25 is thus favorably wound around the rotor magnets 23 without loosening of the protective member 25 in the state in which a tension is circumferentially applied to the protective member 25. This configuration thus allows the protective member 25 to favorably press the rotor magnets 23 from radially outward of the rotor magnets 23.

In addition, this configuration eliminates a necessity to separately provide a member for hanging the protective member 25 since the protective member 25 is hung on one of the rotor magnets 23. This configuration thus enables reduction in parts count of the rotor 20 and parts count of the motor 10.

For example, the corners of the rotor core 22 occasionally remain sharp-pointed without being chamfered. On the other hand, the corners of each rotor magnet 23 are occasionally rounded by chamfering. Therefore, providing the hanging portion 23b on one of the rotor magnets 23 decreases a possibility that the protective member 25 is cut by rubbing against the corners, as compared with a case where the rotor core 22 is provided with the hanging portion.

According to the present embodiment, the first end 25a of the protective member 25 has a loop shape. This configuration allows the first end 25a to be easily and firmly hung on the hanging portion 23b. This configuration therefore decreases a possibility that the first end 25a is removed from the hanging portion 23b in winding the protective member 25.

According to the present embodiment, the protective member 25 has a thread shape. Therefore, the protective member 25 is easily wound without radial overlaps, as compared with a case where the protective member 25 has, for example, a tape shape. This configuration thus inhibits increase in radial thickness of the protective member 25. This configuration therefore inhibits increase in radial size of the rotor 20. In addition, since the first end 25a of the protective member 25 has a loop shape as described above, the first end 25a of the protective member 25 is easily hung on the hanging portion 23b, as compared with the case where the protective member 25 has, for example, a tape shape.

According to the present embodiment, the protective member 25 has elasticity. Therefore, when the protective member 25 is wound around the rotor magnets 23 while being pulled and expanded, the protective member 25 tightens the rotor magnets 23 from radially outward of the rotor magnets 23 by a resilience of the contracting protective member 25. This configuration therefore allows the protective member 25 to press the rotor magnets 23 against the rotor core 22, thereby favorably pressing the rotor magnets 23.

According to the present embodiment, the protective member 25 is fixed to the rotor magnets 23 with the adhesive. This configuration therefore decreases a possibility that the protective member 25 is separated from the rotor magnets 23. In addition, this configuration favorably maintains the state in which a tension is applied to the protective member 25, and also maintains the state in which the protective member 25 favorably presses the rotor magnets 23.

According to the present embodiment, the hanging portion 23b is one of the protrusions 23a of the rotor magnets 23, the protrusion 23a protruding downward of the rotor core 22. Therefore, the hanging portion 23b is easily formed by increasing the axial size of each rotor magnet 23 such that the protrusion 23a protrudes downward of the rotor core 22. This configuration therefore simplifies the shape of each rotor magnet 23, and facilitates the manufacture of the rotor magnets 23. Since the rotor magnets 23 axially protrude from the rotor core 22 as described above, the rotation sensors 52 are disposed radially inside the rotor magnets 23. This configuration thus improves the detection accuracy by the rotation sensors 52. In other words, when the rotor magnets 23 have the protrusions 23a, the detection accuracy of the rotation sensors 52 is improved, and one of the protrusions 23a is used as the hanging portion 23b.

Since the rotor magnets 23 are fixed to the rotor core 22, a radially inner portion of the first end 25a of the protective member 25 is hung on the rotor core 22 from below when the protective member 25 is spirally wound upward from below while being circumferentially pulled. This configuration blocks upward movement of the first end 25a. Therefore, the protective member 25 is spirally wound upward from below in a favorable manner.

The present invention is not limited to the foregoing embodiment, but can adopt other configurations. The shape of the protective member is not particularly limited as long as the protective member is circumferentially wound around the rotor magnets to press the rotor magnets from radially outward of the rotor magnets. For example, the protective member may have flexibility such that the protective member expands longer in one direction. The protective member may have, for example, a tape shape. The protective member may be a magnetic member. The first end of the protective member does not necessarily have a loop shape.

In FIG. 2, the resin portion 26 entirely covers the rotor magnets 23 from radially outward of the rotor magnets 23; however, the present invention is not limited to this configuration. The resin portion may cover only portions, around which the protective member is around, of the rotor magnets from radially outward of the rotor magnets. In this case, for example, the radially outer faces of the protrusions of the rotor magnets are exposed radially outward of the rotor.

The first end of the protective member to be hung on the hanging portion may be the winding ending end of the protective member. The opposite ends of the protective member may be circumferentially hung on one of the rotor magnets. In this case, for example, the rotor magnets protrude axially upward and downward of the rotor core, and the second end of the protective member is hung on a portion, which protrudes upward of the rotor core, of one of the rotor magnets. In this case, the protective member is not necessarily fixed with the adhesive.

Figure 6:
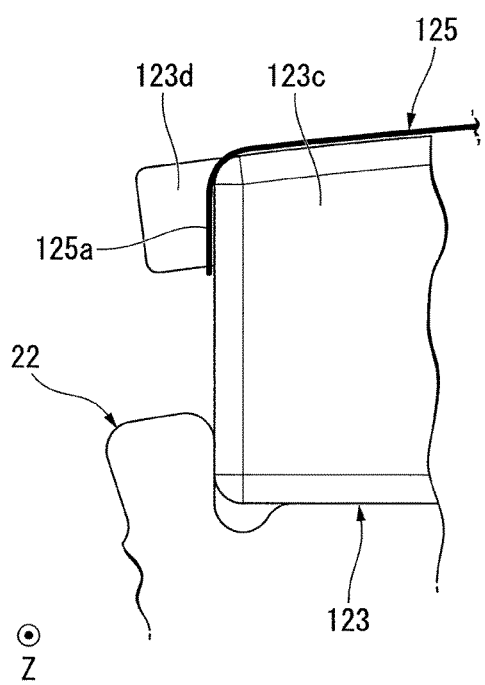
FIG. 6 is a view of another exemplary rotor magnet according to the present embodiment, the rotor magnet being seen from above.

The hanging portion is not particularly limited as long as the protective member is circumferentially hung on the hanging portion. The hanging portion may have a configuration like a hanging portion 123d illustrated in FIG. 6. As illustrated in FIG. 6, a rotor magnet 123 includes a magnet main body 123c and the hanging portion 123d. For example, the magnet main body 123c is similar in shape to each rotor magnet 23 in the foregoing embodiment. The hanging portion 123d protrudes toward the first side in the circumferential direction from a radially outer end of the magnet main body 123c. A first end 125a of a protective member 125 is circumferentially hung on the hanging portion 123d. The first end 125a has, for example, a loop shape, which is similar to the first end 25a in the foregoing embodiment. For example, a lower end of the rotor magnet 123 may be located at the same axial position as a lower end of a rotor core 22.

The rotor does not necessarily include the plurality of rotor magnets as long as the hanging portion is provided. For example, the rotor may include a cylindrical rotor magnet which is a single member. In this case, the cylindrical rotor magnet may be provided with a hanging portion protruding axially, for example.

The rotor and the motor according to the foregoing embodiment may be used for any purpose. The rotor and the motor according to the foregoing embodiment may be installed in, for example, a vehicle and the like. It should be noted that the respective configurations described herein may be appropriately combined insofar as there are no inconsistencies.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor rotatable about a central axis, the rotor comprising:
a rotor core having a ring shape;
a rotor magnet fixed to a radially outer face of the rotor core; and
a protective member circumferentially wound around the rotor magnet to press the rotor magnet from radially outward of the rotor magnet, wherein the protective member has a thread shape, the protective member has elasticity, and the protective member is fixed to the rotor magnet with an adhesive,
wherein the rotor magnet includes a hanging portion on which a first end of the protective member is hung circumferentially;
a plurality of the rotor magnets circumferentially spaced apart from one another,
the rotor magnets each including a protrusion protruding toward a first side in an axial direction with respect to the rotor core, and
the protrusion serving as the hanging portion.

2. The rotor according to claim 1, further comprising a plurality of rotor magnets, wherein the rotor magnet is one of the plurality of rotor magnets, and the protective member comprises a continuous portion contacting each of the plurality of rotor magnets.

3. The rotor according to claim 2, wherein the protective member is spirally wound around the plurality of rotor magnets.

4. The rotor according to claim 1, wherein
the first end of the protective member has a loop shape.

5. The rotor according to claim 1, wherein
the protective member is a non-magnetic member.

6. A motor comprising:
the rotor according to claim 1;
a stator located radially outside the rotor; and
a magnetic sensor configured to detect a magnetic field of the rotor magnet,
the magnetic sensor being located radially inside the protrusion.

7. A motor comprising:
the rotor according to claim 1; and
a stator located radially outside the rotor.

8. The rotor according to claim 1, wherein the first end of the protective member surrounds the rotor magnet.

9. The rotor according to claim 1, wherein the first end of the protective member comprises a loop tied to a portion of the protective member.

10. The rotor according to claim 1, wherein the adhesive is on a radially outward surface of the protective member.

11. The rotor according to claim 1, wherein the hanging portion protrudes radially from a main body of the rotor magnet.

12. The rotor according to claim 1, wherein the handing portion protrudes axially from a main body of the rotor magnet.

13. The rotor according to claim 1, wherein the rotor magnet is a single member circumferentially surrounding the rotor.

14. An unmanned aircraft comprising the rotor according to claim 1.

* * * * *